US006219817B1

(12) United States Patent
Holman

(10) Patent No.: US 6,219,817 B1
(45) Date of Patent: Apr. 17, 2001

(54) ERROR CORRECTION AND DETECTION FOR FAULTS ON TIME MULTIPLEXED DATA LINES

(75) Inventor: Thomas J. Holman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/063,337

(22) Filed: Apr. 20, 1998

(51) Int. Cl.$^7$ .................................................. H03M 13/00
(52) U.S. Cl. .................... 714/785; 714/785; 714/784; 714/758; 710/20; 710/244
(58) Field of Search ................................. 714/785, 784, 714/759, 758, 807, 774; 710/20, 40, 244

(56) References Cited

U.S. PATENT DOCUMENTS

| | | | |
|---|---|---|---|
| 3,825,893 | 7/1974 | Bossen et al. | 340/146.1 |
| 4,509,172 | 4/1985 | Chen | 371/38 |
| 4,692,922 | 9/1987 | Kiriu et al. | 371/37 |
| 5,003,539 | * 3/1991 | Takemoto et al. | 714/785 |
| 5,040,179 | 8/1991 | Chen | 371/37.1 |
| 5,430,739 | * 7/1995 | Wei et al. | 714/784 |
| 5,490,260 | * 2/1996 | Miller et al. | 711/100 |
| 5,511,078 | * 4/1996 | Barucchi et al. | 714/763 |
| 5,537,423 | * 7/1996 | Chen | 714/781 |
| 5,856,987 | * 1/1999 | Holman | 371/37.01 |

OTHER PUBLICATIONS

Copy of Application Serial No. 08/801,617, filed Feb. 18, 1997, for "A Sec–Ded–S4ed Rotational Error Correction Code For A Computer System", Thomas J. Holman.

"Error–Control Coding For Computer Systems", T.R.N. Rao, et al., pp. 221–298, 1989.

* cited by examiner

Primary Examiner—Ayaz Sheikh
Assistant Examiner—Firmin Backer
(74) Attorney, Agent, or Firm—Seth Kalson

(57) ABSTRACT

Error correction and detection for time-multiplexed binary 72-tuples over 18 wires to detect a wire fault. A syndrome is computed using a parity check matrix, where circuits for realizing the parity check matrix multiplication can be realized with only two levels of XOR gates and in which the computation is pipelined to process the time-multiplexed binary 72-tuple.

26 Claims, 5 Drawing Sheets

ERROR CORRECTION AND DETECTION FOR FAULTS ON TIME MULTIPLEXED DATA LINES

BACKGROUND

Methods for error detection and correction were initially developed for transmitting information reliably over noisy channels. However, error detection and correction has also found applications to computer technology because the transmission of information bits via a bus, or the storage and retrieval of information bits from memory, are formally similar to the communication of information over a noisy channel.

The theory of error correction borrows heavily from algebra, specifically the theory of Galois fields. The search for good codes with efficient decoding techniques has been facilitated by restricting them to being linear, and often involves restricting the codes to those with certain desirable algebraic properties. However, the search for good codes suitable for specific processing requirements dictated by computer hardware can be a difficult task, and is not always necessarily made easier by borrowing from algebraic coding theory or by relying upon the work of previous coding theorists who have directed their research to the communication of information over noisy channels.

Specifically, in retrieving stored information from memory, there may be a fault in a wire making up part of a bus. If data is time-multiplexed, then a single wire fault may result in multiple errors with specific spatial correlation. For example, if a 64 bit word is multiplexed over 4 wires, then a fault in one wire will cause errors separated by multiples of 4.

Codes capable of detecting or correcting multiple errors have been previously designed, but they are designed for random errors or burst errors. In the former case, such codes are too costly in terms of circuit area or latency, and in the latter case they are not applicable to the problem of detecting a wire fault on a bus with time-multiplexed data. It is therefore desirable for a method of error detection to detect multiple errors which are due to a single wire fault in a time-multiplexed system, and which consumes relatively little circuit area with relatively small latency in its implementation.

DETAILED DESCRIPTION OF EMBODIMENTS

Figure 1:
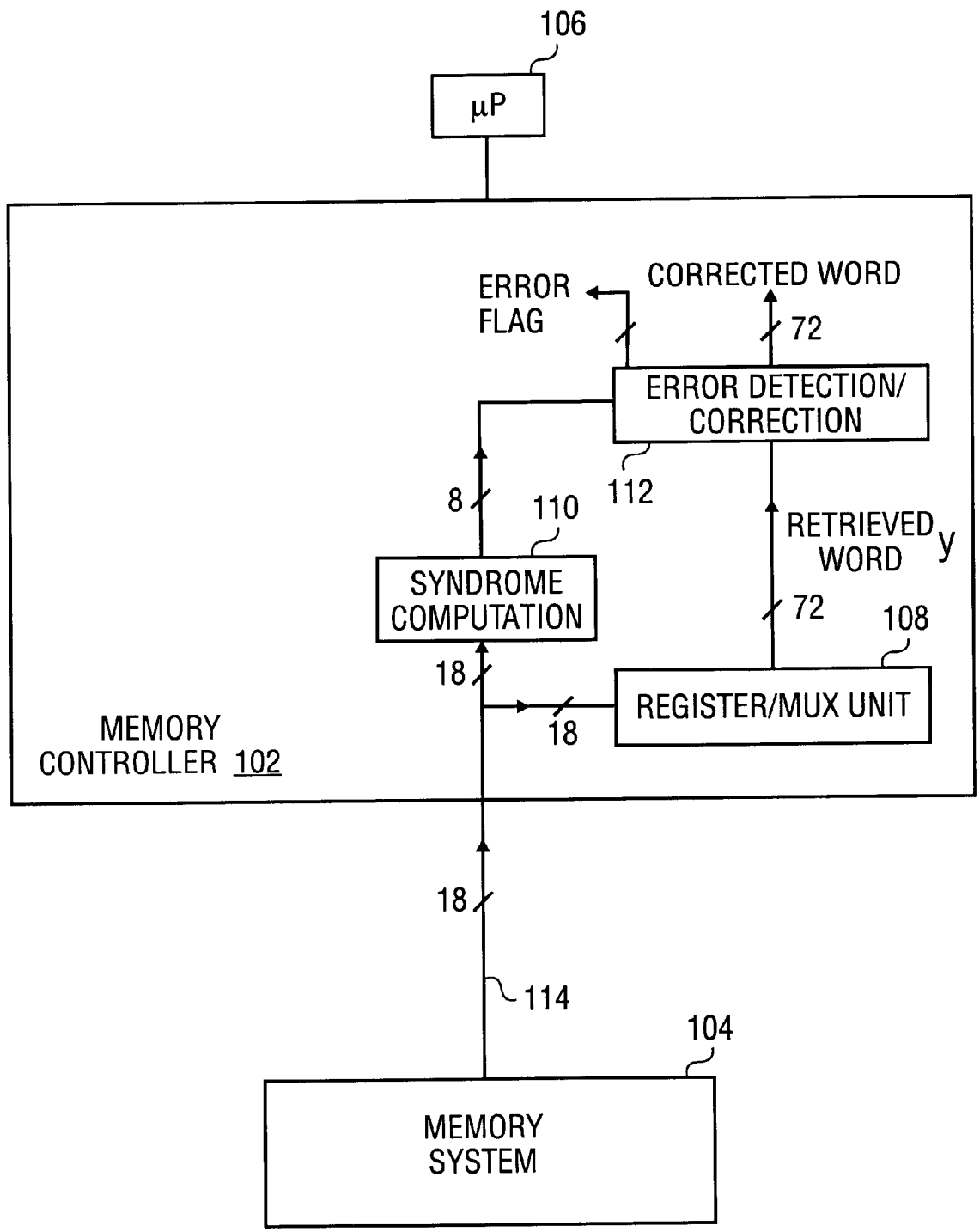
FIG. 1 is a functional diagram of a decoder within a memory controller coupling a memory system to a microprocessor.

We begin with standard terminology. Codewords will be row vectors of length n, where the components of the codewords belong to GF(q) (Galois field with q elements). We shall restrict ourselves to binary codewords, so that we will be concerned with multiplication and addition in GF(2) (i.e., modulo-2 addition and multiplication). Equivalently, a codeword is an n-tuple $GF(2)^n$.

Let H denote an $(n-k) \times n$ matrix ($k<n$) with components belonging to GF(2). A linear code C may be defined as the set of codewords $C = \{x: Hx^T = \vec{0}\}$ where x is an n-tuple row vector in $GF(2)^n$, $\vec{0}$ denotes the null n-tuple, $x^T$ denotes the transpose of x, and all multiplication and addition is performed in GF(2). H is referred to as a parity check matrix for code C. If H has rank $n-k$, then the number of distinct codewords belonging to C is $2^k$. We shall assume that all $(n-k) \times n$ parity check matrices are of rank $n-k$. The number of information bits in a codeword is k and the number of parity check bits is $n-k$.

A code equivalent to C can be obtained by interchanging columns of H and performing elementary row operations on H. That is, the code $C' = \{x: H'x^T = \vec{0}\}$ is equivalent to C, where H' denotes a parity check matrix obtained by interchanging columns of H as well as performing elementary row operations upon H. Code equivalence means that the two codes have the same set of Hamming distances. In the above case, codewords in one code are related to codewords in the other code by a rearrangement of the order of their components.

Given a parity check matrix H, we can perform column interchanges and elementary row operations so as to put it into standard form. An $(n-k) \times n$ parity check matrix is in standard form if it is of the form:

$$[A | I_{n-k}]$$

where A is an $(n-k) \times k$ matrix and $I_{n-k}$ is the $(n-k) \times (n-k)$ identity matrix. Given any $(n-k) \times n$ parity check matrix H, we let $H_S$ denote the standard form parity check matrix obtained from H by column interchanges and elementary row operations.

A linear code C can also be defined by an $k \times n$ generator matrix G where $C = \{x = uG: u \in GF(2)^k\}$. The row vector u may be interpreted as the information symbols (bits) to be encoded. If G is of rank k, then C has $2^k$ distinct codewords. We shall assume that all $k \times n$ generator matrices have rank k. Given a parity check matrix H for some code C, a generator matrix G for code C satisfies $HG^T = 0$ and $GH^T = 0$, where in these two equations the dimensions for the zero matrices "0" must be properly interpreted from context. For the particular case in which H is of standard form as given in the previously displayed equation, G is given by:

$$G = [I_k | -A^T]$$

where $I_k$ is the $k \times k$ identity matrix. A code obtained from a generator matrix in the above form is a systematic code, since the first k components of the codewords are the information symbols and the remaining $n-k$ are the parity symbols.

Given any n-tuple row vector $y \in GF(2)^n$, the syndrome s associated with y is given by $s = Hy^T$. In practice, y is the retrieved word from memory (or in a communication setting, is the received word after demodulation). Since $y = x + e$, where x is a codeword and e is the error vector, the syndrome is seen to be $s = He^T$. Depending upon the structure of the parity check matrix, various types of error vectors e can be detected or perhaps corrected by computing the syndrome associated with a received (or retrieved) n-tuple. For all linear codes, no error is declared in a received n-tuple if its computed syndrome is equal to the null n-tuple. However, the way in which errors are detected or corrected for non-zero weight syndromes depends upon the parity check matrix.

To protect information stored in memory, parity check bits are included with information bits so that the resulting vector of bits constitutes a codeword, and the codeword is stored in memory. When retrieving information bits from memory, the entire word containing the possibly corrupted information bits and parity check bits is retrieved, and error detection or correction is applied to the word. The term "word" rather than "codeword" is used in the previous sentence because the codeword stored in memory may have been corrupted upon retrieval so that what is retrieved is no longer a codeword.

In FIG. 1, error detection and correction is employed by memory controller 102 to correct a retrieved word, or to detect errors in the retrieved word. Memory controller 102 provides communication between memory system 104 and processor 106. Only a portion of memory controller 102 is abstracted via functional units 108, 110, and 112. Functional units 108, 110, and 112 comprise a decoder unit. Error detection/correction functional unit 112 corrects a corrupted retrieved word (if correctable) from memory to thereby provide the codeword (or just the information bits) to microprocessor 106, and provides an error flag signal (or signals) to microprocessor 106 indicating when an error is detected in the retrieved the word.

In the particular embodiment illustrated in FIG. 1, 18 wires provide a data path between memory system 104 and memory controller 102, and the words stored to and retrieved from memory system 104 are of length 72, where 64 bits are information bits and 8 bits are parity bits. The 72 bit words are time-multiplexed over the 18 wires 114. Register/MUX functional unit 108 de-multiplexes the signals from memory system 104 to provide a 72 bit retrieved word to error detection/correction functional unit 112. Syndrome computation functional unit 110 receives the retrieved word from memory system 104 in a pipelined fashion, processing 18 bits of data during each bus phase or bus clock cycle. By working in a pipelined fashion, syndrome computation functional unit 110 provides the computed syndrome to error detection/correction functional unit 112 with low latency. As will be described hereinafter, functional units 110 and 112 can detect a wire fault in one of the 18 wires 114 coupling memory system 104 to memory controller 102.

In an embodiment, functional units 110 and 112 use the 8 by 72 parity check matrix displayed below for protecting data time-multiplexed on wires 114 because a single pattern of errors in a received 72-tuple in which the errors are separated by multiples of 18 can be detected. Additionally, a single error can be corrected, and a double error can be detected. If a bus is comprised of 18 wires, and a 72 bit word is multiplexed over these 18 wires, then a single wire fault can be detected because it will cause errors separated by multiples of 18.

Figure 2:
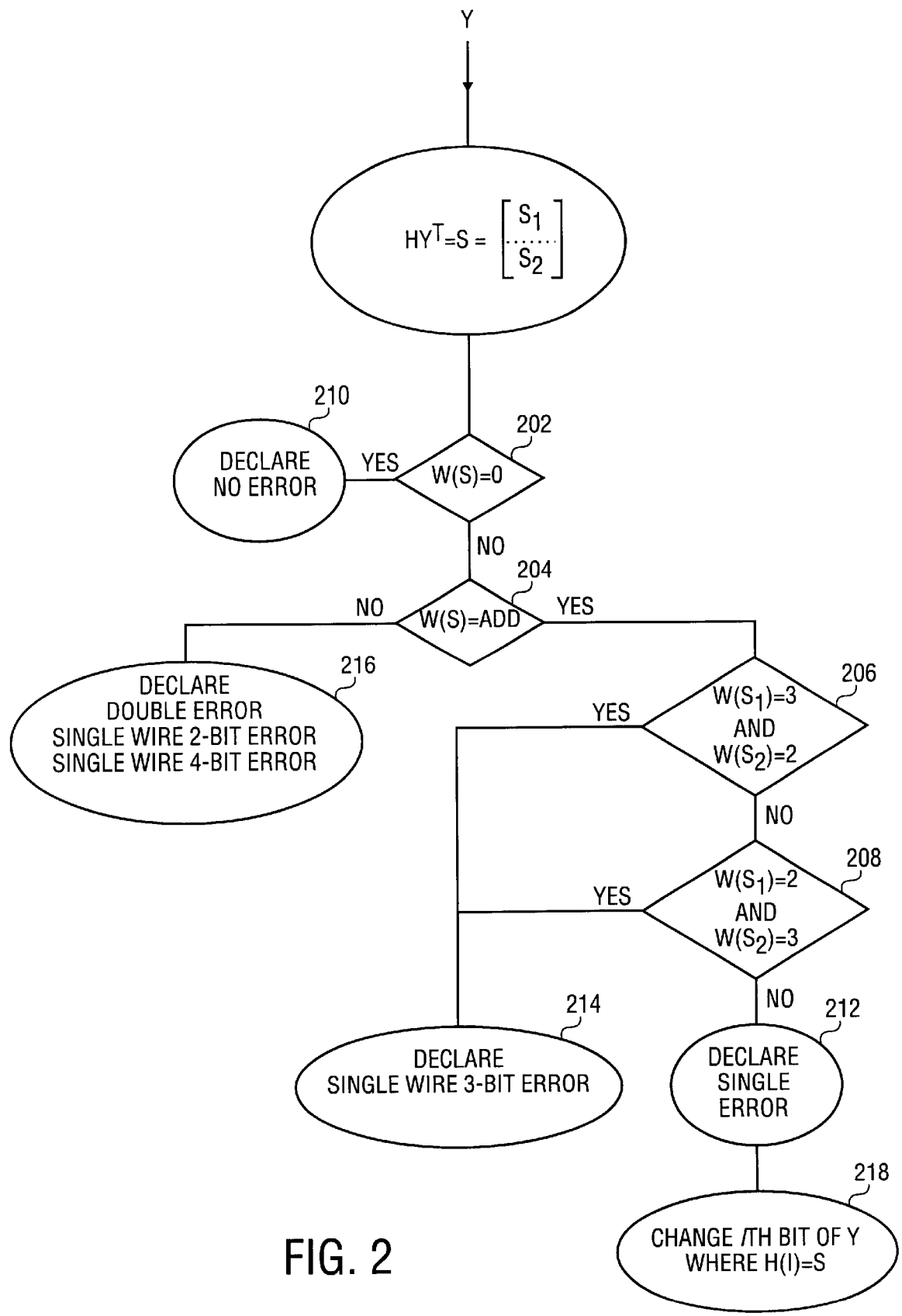
FIG. 2 is a flow diagram for error detection and correction of the decoder.

The function of error detection/correction functional unit 112 is now described in more detail and is illustrated in the flow diagram of FIG. 2. A syndrome s for the above parity check matrix H is an 8-tuple column vector, which may be written as $$s = \begin{bmatrix} s_1 \\ s_2 \end{bmatrix}$$

where $s_1$ and $s_2$ are 4-tuple column vectors. After the syndrome for the parity check matrix H is computed by syndrome computation functional unit 110, error detection/correction functional unit 112 detects a single error if the syndrome s is of odd weight and if the weights of $s_1$ and $s_2$ are not 3 and 2, respectively, or if s is of odd weight and if the weights of $s_1$ and $s_2$ are not 2 and 3, respectively. The detected single error is corrected by changing the $i^{th}$ bit of the received 72-tuple y, where i is such that the computed syndrome s matches the $i^{th}$ column of H. A single "wire" 3-bit error (i.e., the errors are separated by multiples of 18) is declared if s is of odd weight and if the weights of $s_1$ and s2 are either 3 and 2, respectively, or 2 and 3, respectively. A double error, single wire 2-bit error, or single wire 4-bit error, is declared if s is of even weight and non-zero weight. These properties for the parity check matrix can be verified by trying all possible error patterns as just described.

FIG. 2 illustrates a flow diagram of the above procedure performed by error/detection functional unit 112. In branches 202, 204, 206, and 208, w( ) denotes the weight of a vector (i.e., the Hamming weight). As in most coding schemes, it should be noted that the declarations made in 210, 212, 214, and 216 will not always be correct. For example, 210 indicates that no error is declared if the weight of the syndrome is zero. However, suppose that some codeword x, was stored but the received word is $y=x_1+x_2$, where $x_2$ is also a codeword. In this case, the error vector happens to be a codeword. Because the code is linear, y is also a codeword, and no error will incorrectly be declared. However, each declaration 210, 212, 214, and 216 will be correctly reached in the flow diagram if the error vector satisfies their declarations.

The generator matrix G for the parity check matrix H displayed above can easily be obtained from inspection. Note that the 8 by 8 identity matrix can be found in columns 3, 12, 21, 30, 44, 53, 62, and 71 (where the columns are numbered from left to right starting with 0). Therefore, only column interchanges are needed to put H into the standard form matrix $H_s$. Once in standard form, the generator matrix for the systematic code, $G_s$, can be obtained from $H_s$ as discussed previously, and then the inverse of the column interchanges can be applied to $G_s$ to obtain G.

Figure 3:
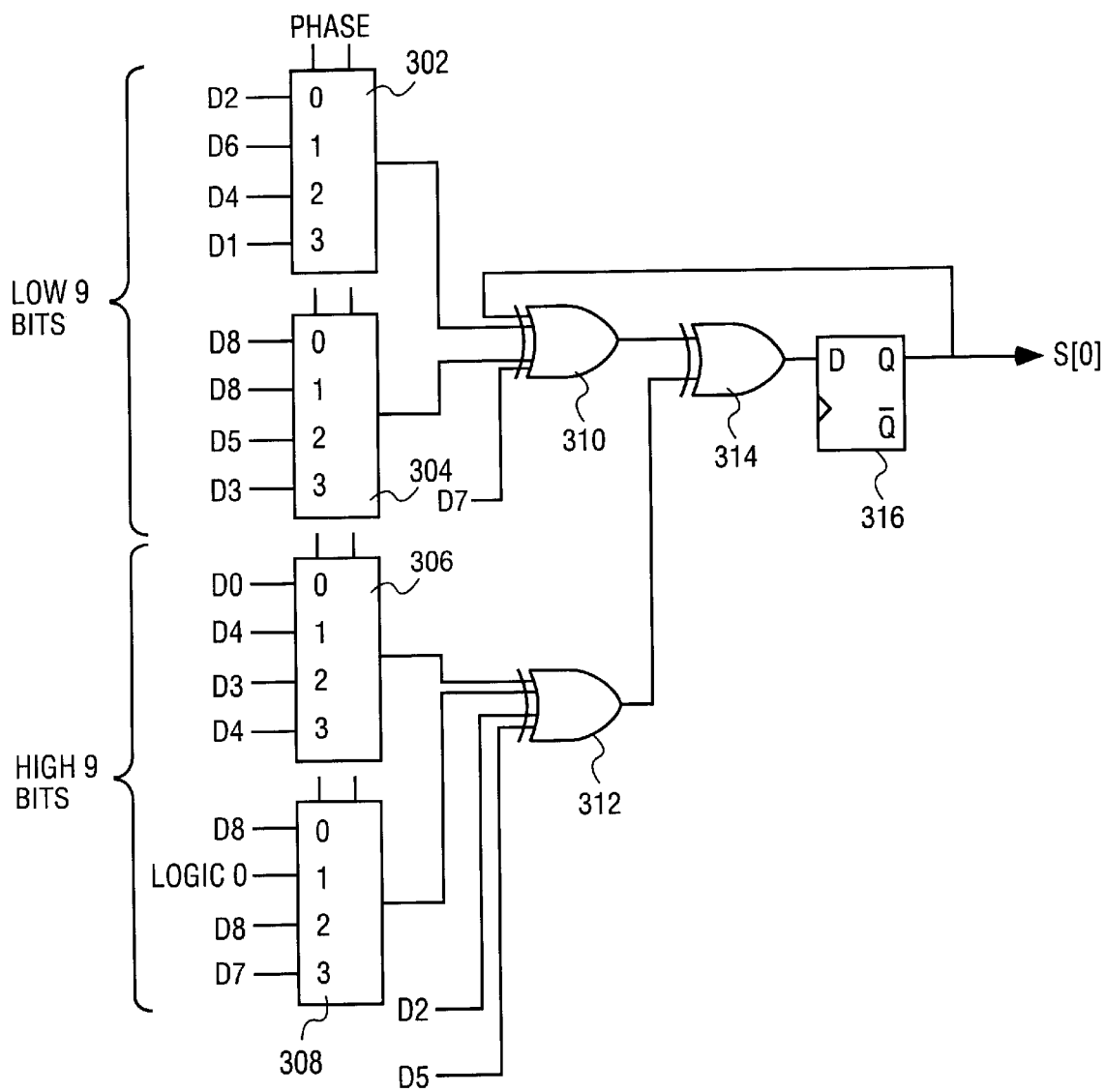
FIG. 3 is a circuit implementation for computing one bit of the syndrome.

Note that each row of H has only 27 ones. Furthermore, the ones are spread throughout the parity check matrix so that syndrome computation functional unit 110 can be realized by a relatively simple circuit to compute the syn- $$H = \begin{bmatrix} 001000011101001001000000111001011000000110100011010010101000100010011010 \\ 010010010010100101001000011110000101000010110010100110000101010010010100 \\ 100011000001000111110100001001010100101000000101001001001001000011110100 \\ 100010100010001001100001001010011010110110000010100010110000111000100 \\ 101001001001000011001011000000001110011010010000011010001011010010100010 \\ 010100101010010010110000101001000011010100110000010110010010100000101010 \\ 001000111100011000001010100110100001101100100101000000001110100100100100 \\ 010001001100010100010011010100001001010101000110110000110001000101100001 \end{bmatrix}$$

dromes in a pipelined fashion. FIG. 3 provides an embodiment for computing the first bit of a syndrome in a pipelined manner. The received 72-tuple y is divided into four 18-bit blocks, and within each 18-bit block the low 9 bits are the first group of 9 bits and the high 9 bits are the second group of 9 bits. In practice, there may only be 18 wires, so the 72-tuple y is multiplexed over the 18 wires 114 for a duration of 4 phases or bus clock cycles. In FIG. 3, $d_i$, i=0,1, . . . ,8 refers to 9 bits of data within a given block of 9 bits (the position number begins with zero). During each phase, a new block of 18 bits is made available to the circuit of FIG. 3. Thus, $d_i$, i=0,1, . . . ,8 in the top-half of FIG. 3 may be thought of as a first group of 9 wires, and $d_i$, i=0,1, . . . ,8 in the bottom-half of FIG. 3 may be thought of as a second group of 9 wires.

For example, during the first phase, MUX 302 and MUX 304 provide to XOR (exclusive-OR) gate 310 the second and eighth components of the low 9-bit block of the first 18-bit block of y, respectively, which are simply the second and eighth components of y. Similarly, during the first phase, MUX 306 and MUX 308 provide to XOR gate 312 the zeroth and eighth components of the high 9-bit block of the first 18-bit block of y, respectively, which are the ninth and seventeenth components of y, respectively.

The XOR gates of FIG. 3 perform the necessary GF(2) arithmetic. Note that wire $d_7$ of the low 9 bits is a fixed input to XOR gate 310 for all clock phases and that wires $d_2$ and $d_5$ are fixed inputs to XOR gate 312. The outputs of XOR gates 310 and 312 are fed to XOR gate 314 and latched by latch 316. On the next phase or clock cycle, the partial result stored in latch 316 is available to XOR gate 310. After all four 18-bit blocks have been processed, the result is available in latch 316. The circuit of FIG. 3 requires only 8 XOR inputs for the first level of XOR gates, and only two XOR inputs for the second level consisting of one XOR gate. Similar types of circuits for computing the other bits of the syndrome should be obvious by inspection of the parity check matrix H. All such circuits have the same level of complexity.

Figure 4:
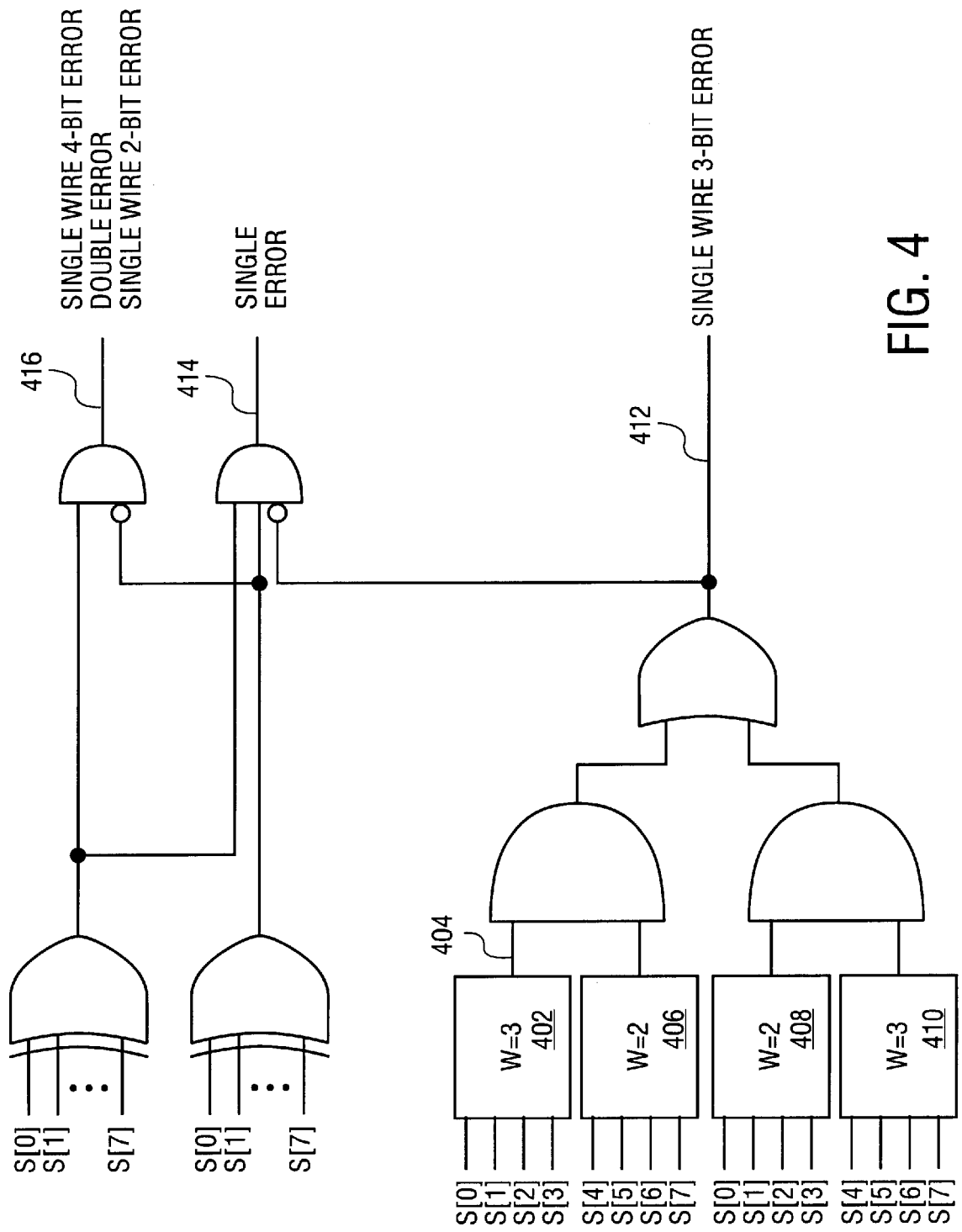
FIG. 4 is an embodiment for providing error flag signals.
Figure 5:
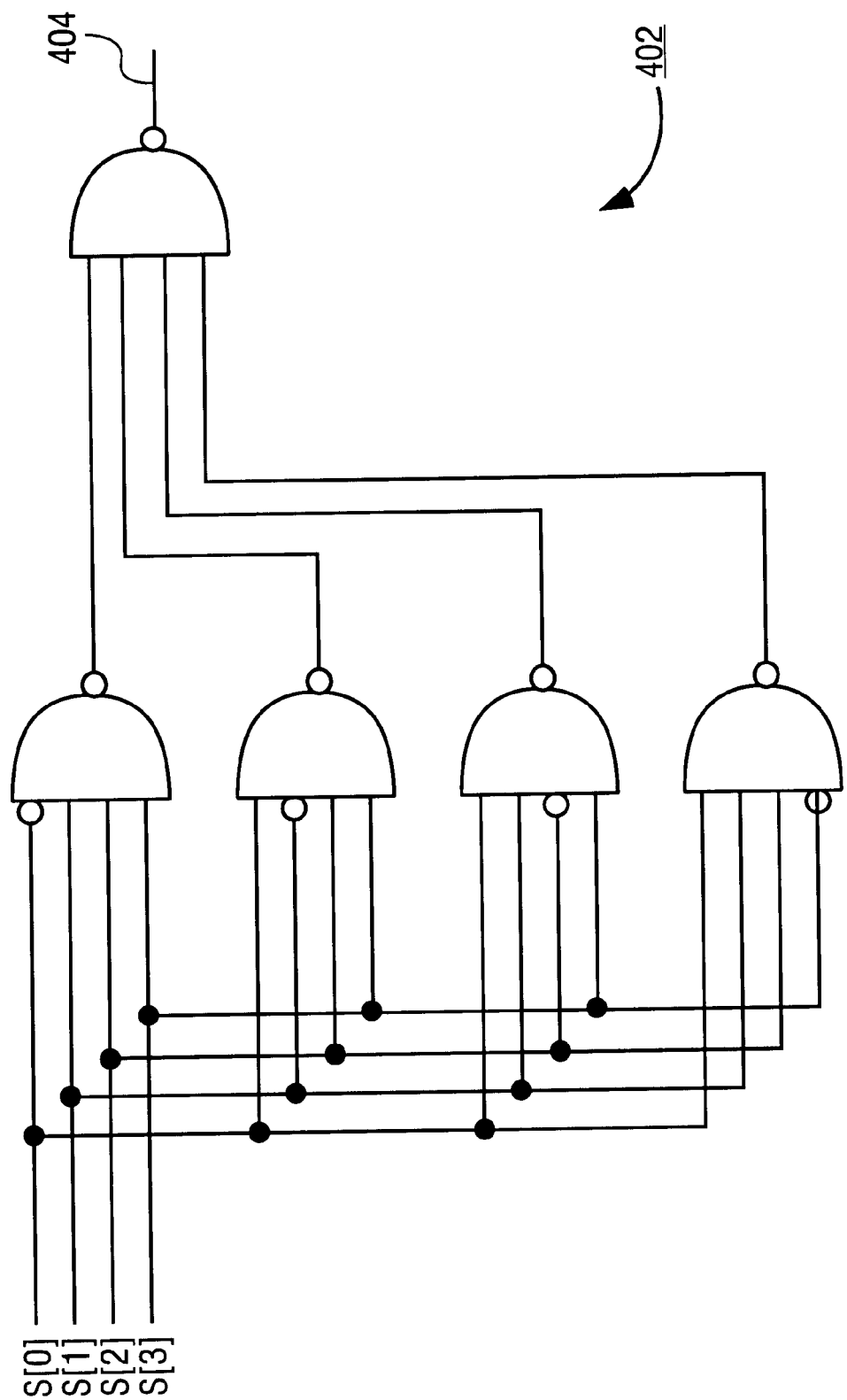
FIG. 5 is an embodiment of a functional unit in FIG. 4 for detecting a specific Hamming weight.

FIG. 4 is an embodiment for that portion of error detection/correction functional unit 112 providing error flag signals. In FIG. 4, the $i^{th}$ component of s is denoted as s[i]. Functional unit 402 asserts line 404 HIGH if and only if the 4-bit word formed from its four input bits, which is $s_1$, has weight equal to three. Similar functions apply to functional units 406, 408, and 410 as indicated in FIG. 4. Line 412 is asserted HIGH to indicate that a single wire 3-bit error is detected, line 414 is asserted HIGH to indicate that a single error is detected (which may be corrected as indicated in 218 in the flow diagram of FIG. 2), and line 416 is asserted HIGH to indicate that either a single wire 4-bit error, a double error, or a single wire 2-bit error is detected. Functional units 402, 406, 408, and 410 are easily synthesized from logic gates. For example, FIG. 5 is an embodiment for functional unit 402.

Various modifications may be made to the embodiments disclosed herein without departing from the scope of the invention as claimed below.

vector form and where H is a 8 by 72 matrix in GF(2) chosen from the set of matrices related by column interchanges and elementary row operations to the matrix $$\begin{bmatrix} 001000011101001001000000 \\ 010010010010100101001000 \\ 100011000001000111110100 \\ 100010100010001001100001 \\ 101001001001000011001011 \\ 010100101010010010110000 \\ 001000111100011000001010 \\ 010001001100010100010011 \end{bmatrix}$$

$$\begin{bmatrix} 111001011000000011010001 \\ 011110000101000010110010 \\ 001001010010101000000101 \\ 001010011010110110000010 \\ 000000000111001101001000 \\ 101001000011010100110000 \\ 100110100001101100100101 \\ 010100001001010101000110 \end{bmatrix}$$

$$\begin{bmatrix} 101001010100010001011010 \\ 100110000101010010010100 \\ 100100100100100001110100 \\ 101000101100001110001000 \\ 011010001011010010100010 \\ 010110010010100000101010 \\ 000000001110100100100100 \\ 110000110001000101100001 \end{bmatrix}$$

2. The decoder as set forth in claim 1, wherein H is the matrix $$\begin{bmatrix} 001000011101001001000000 & 111001011000000011010001 & 101001010100010001011010 \\ 010010010010100101001000 & 011110000101000010110010 & 100110000101010010010100 \\ 100011000001000111110100 & 001001010010101000000101 & 100100100100100001110100 \\ 100010100010001001100001 & 001010011010110110000010 & 101000101100001110001000 \\ 101001001001000011001011 & 000000000111001101001000 & 011010001011010010100010 \\ 010100101010010010110000 & 101001000011010100110000 & 010110010010100000101010 \\ 001000111100011000001010 & 100110100001101100100101 & 000000001110100100100100 \\ 010001001100010100010011 & 010100001001010101000110 & 110000110001000101100001 \end{bmatrix}$$

What is claimed is:

1. A decoder comprising:
a syndrome computation circuit to receive a 72-tuple y with components in GF(2) to compute in GF(2) a syndrome s where $s=Hy^T$, where y is expressed in row 3. The decoder as set forth in claim 1, further comprising:
a first circuit to provide a signal indicative of a first group of four bits of s and a second group of four bits of s having weights three and two, respectively, or having weights two and three, respectively, the first and second groups of four bits representing all eight bits of s.

4. The decoder as set forth in claim 3, further comprising: a second circuit to provide a signal indicative of s having an odd weight, the first group of four bits not having a weight equal to two or three, and the second group of four bits not having a weight equal to two or three.

5. The decoder as set forth in claim 2, further comprising: a first circuit to provide a signal indicative of a first group of four bits of s and a second group of four bits of s having weights three and two, respectively, or having weights two and three, respectively, the first group of four bits of s representing first four bits of s and the second group of four bits of s representing last four bits of s.

6. The decoder as set forth in claim 5, further comprising: a second circuit to provide a signal indicative of s having an odd weight, the first group of four bits not having a weight equal to two or three, and the second group of four bits not having a weight equal to two or three.

7. The decoder as set forth in claim 1, further comprising: multiplexers to receive the 72-tuple y; and wherein the syndrome calculation circuit further comprises data latch circuits, wherein 18 bits of y are received by the mutliplexers at a rate equal to the rate that the data latch circuit latches data, wherein the data latch circuits provide the syndrome at one-fourth the rate.

8. The decoder as set forth in claim 2, further comprising: multiplexers to receive the 72-tuple y; and wherein the syndrome calculation circuit further comprises data latch circuits, wherein 18 bits of y are received by the multiplexers at a rate equal to the rate that the data latch circuit latches data, wherein the data latch circuits provide the syndrome at one-fourth the rate.

9. A decoder comprising:

a syndrome computation circuit to receive a 72-tuple y with components in GF(2) to compute in GF(2) a syndrome s where $s=Hy^T$, where y is expressed in row vector form and where H is a 8 by 72 matrix in GF(2); and an error detection circuit coupled to the syndrome computation circuit to provide at least one error flag signal indicative of an error pattern in the 72-tuple y with errors separated by multiples of 18.

10. The decoder as set forth in claim 9, the error detection circuit further comprising:

a first circuit to provide a first error flag signal indicative of a first group of four bits of s and a second group of four bits of s having weights three and two, respectively, or having weights two and three, respectively, the first and second groups of four bits representing all eight bits of s.

11. The decoder as set forth in claim 10, the error detection circuit further comprising:

a second circuit to provide a second error flag signal indicative of s having a non-zero even weight; and to provide a third error flag signal indicative of s having an odd weight, the first group of four bits not having a weight equal to two or three, and the second group of four bits not having a weight equal to two or three.

12. The decoder as set forth in claim 11, wherein the first error flag signal is indicative of a 3-bit error pattern with bit errors separated by multiples of 18; the second error flag signal is indicative of a double bit error, a 2-bit error pattern with bit errors separated by multiples of 18, or a 4-bit error pattern separated by multiples of 18; and the third error flag signal is indicative of a single bit error.

13. A method for detecting data errors on a set of wires, the method comprising:

receiving by a memory controller a binary 72-tuple y from the set of wires; and performing in at least one circuit $s=Hy^T$ in GF(2) arithmetic to obtain the syndrome s, where H is a 8 by 72 matrix in GF(2) given by $$\begin{bmatrix} 001000011101001001000000 & 111001011000000011010001 & 101001010100010001011010 \\ 010010010010100101001000 & 011110000101000010110010 & 100110000101010010010100 \\ 100011000001000111110100 & 001001010100101000000101 & 100100100100100001110100 \\ 100010100010001001100001 & 001010011010110110000010 & 101000101100001110001000 \\ 101001001001000011001011 & 000000000111001101001000 & 011010001011010010100010 \\ 010100101010010010110000 & 101001000011010100110000 & 010110010010100000101010 \\ 001000111100011000001010 & 100110100001101100100101 & 000000001110100100100100 \\ 010001001100010100010011 & 010100001001010101000110 & 110000110001000101100001 \end{bmatrix}.$$

14. The method as set forth in claim 13, further comprising:

declaring by a memory controller a single wire 3-bit error if $w(s)\neq 0$, $w(s_1)=3$, and $w(s_2)=2$, where $s_1$ is a 4-tuple consisting of the first four bits of s and $s_2$ is a 4-tuple consisting of the second four bits of s;

declaring by the memory controller a single wire 3-bit error if $w(s)\neq 0$, $w(s_1)=2$, and $w(s_2)=3$;

declaring by the memory controller a double error, single wire 2-bit error, or single wire 4-bit error if $w(s)\neq 0$ and w(s) is even; and declaring by the memory controller a single error if $w(s)\neq 0$, w(s) is odd, $w(s_1)\neq 3$, $w(s_2)\neq 2$, $w(s_1)\neq 2$, and $w(s_2)\neq 3$.

15. The method as set forth in claim 13, wherein the syndrome is computed in a pipelined fashion.

16. The method as set forth in claim 14, wherein the syndrome is computed in a pipelined fashion.

17. A method for detecting data errors on a set of wires, the method comprising:

receiving by a memory controller a binary 72-tuple y from the set of wires; and providing at least one circuit to compute in a pipelined fashion $s=HY^T$ in GF(2) arithmetic to obtain the syndrome s, where y is in the form of a row vector, where H is a 8 by 72 matrix in GF(2) given by $$H = \begin{bmatrix} 001000011101001001000000 & 111001011000000011010001 & 101001010100010001011010 \\ 010010010010100101001000 & 011110000101000010110010 & 100110000101010010010100 \\ 100011000001000111110100 & 001001010100101000000101 & 100100100100100001110100 \\ 100010100010001001100001 & 001010011010110110000010 & 101000101100001110001000 \\ 101001001001000011001011 & 000000000111001101001000 & 011010001011010010100010 \\ 010100101010010010110000 & 101001000011010100110000 & 010110010010100000101010 \\ 001000111100011000001010 & 100110100001101100100101 & 000000001110100100100100 \\ 010001001100010100010011 & 010100001001010101000110 & 110000110001000101100001 \end{bmatrix}$$

18. A method for storing and retrieving from a memory system 72-tuples in GF(2), the method comprising:

generating by a memory controller 72-tuples to be stored in the memory system, where each generated 72-tuple x, when in row vector form, satisfies $0 = Hx^T$ where H is a 8 by 72 matrix in GF(2) given by $$H = \begin{bmatrix} 001000011101001001000000 & 111001011000000011010001 & 101001010100010001011010 \\ 010010010010100101001000 & 011110000101000010110010 & 100110000101010010010100 \\ 100011000001000111110100 & 001001010100101000000101 & 100100100100100001110100 \\ 100010100010001001100001 & 001010011010110110000010 & 101000101100001110001000 \\ 101001001001000011001011 & 000000000111001101001000 & 011010001011010010100010 \\ 010100101010010010110000 & 101001000011010100110000 & 010110010010100000101010 \\ 001000111100011000001010 & 100110100001101100100101 & 000000001110100100100100 \\ 010001001100010100010011 & 010100001001010101000110 & 110000110001000101100001 \end{bmatrix}$$

19. The method as set forth in claim 18, further comprising:

receiving by a memory controller a binary 72-tuple y from a set of wires coupled to the memory system; and performing in at least one circuit the operation $s = HY^T$ in GF(2), where y is in row vector form, to obtain the syndrome s.

20. The method as set forth in claim 19, wherein the 72-tuple y is multiplexed over a set of 18 wires.

21. The method as set forth in claim 19, further comprising:

declaring by a memory controller a single wire 3-bit error if $w(s) \neq 0$, $w(s_1) = 3$, and $w(s_2) = 2$, where $s_1$ is a 4-tuple consisting of the first four bits of s and $s_2$ is a 4-tuple consisting of the second four bits of s;

declaring by the memory controller a single wire 3-bit error if $w(s) \neq 0$, $w(s_1) = 2$, and $w(s_2) = 3$;

declaring by the memory controller a double error, single wire 2-bit error, or single wire 4-bit error if $w(s) \neq 0$ and $w(s)$ is even; and declaring by the memory controller a single error if $w(s) \neq 0$, $w(s)$ is odd, $w(s_1) \neq 3$, $w(s_2) \neq 2$, $w(s_1) \neq 2$, and $w(s_2) \neq 3$.

22. The method as set forth in claim 21, wherein the 72-tuple y is multiplexed over a set of 18 wires.

23. A method for detecting data errors on a set of wires, the method comprising:

receiving by a memory controller a binary 72-tuple y from the set of wires; and providing at least one circuit to compute $s = Hy^T$ in GF(2) arithmetic to obtain the syndrome s, where y is in the form of a row vector, where H is a 8 by 72 matrix in GF(2) chosen from a set of 8 by 72 matrices in GF(2) related by column interchanges and elementary row operations to the matrix $$H = \begin{bmatrix} 001000011101001001000000 & 111001011000000011010001 & 101001010100010001011010 \\ 010010010010100101001000 & 011110000101000010110010 & 100110000101010010010100 \\ 100011000001000111110100 & 001001010100101000000101 & 100100100100100001110100 \\ 100010100010001001100001 & 001010011010110110000010 & 101000101100001110001000 \\ 101001001001000011001011 & 000000000111001101001000 & 011010001011010010100010 \\ 010100101010010010110000 & 101001000011010100110000 & 010110010010100000101010 \\ 001000111100011000001010 & 100110100001101100100101 & 000000001110100100100100 \\ 010001001100010100010011 & 010100001001010101000110 & 110000110001000101100001 \end{bmatrix}$$

24. The method as set forth in claim 23, wherein the binary 72-tuple y is received over 18 wires in a time-multiplexed fashion.

25. The method as set forth in claim 24, wherein the at least one circuit computes the syndrome in a pipelined fashion.

26. A method for storing and retrieving from a memory system binary 72-tuples in GF (2), the method comprising:

generating by a memory controller 72-tuples to be stored in the memory system, where each generated 72-tuple x, when in row vector form, satisfies $0 = Hx^T$ where H is a 8 by 72 matrix in GF(2) chosen from a set of matrices obtained by performing column interchanges and elementary row operations upon the matrix $$\begin{bmatrix} 00100001110100100100000 & 111001011000000011010001 & 10100101010001000101011010 \\ 01001001001010010100100 & 011110000101000010110010 & 10011000010101001001010100 \\ 10001100000100011111010100 & 00100101010010100000101 & 10010010010010001011110100 \\ 10001010001000100110000110 & 001010011010110110000010 & 10100010110000111100011000 \\ 10100100100100001100101011 & 000000000111001110100011000 & 01101000101101001010010 \\ 01010010101001001011010000 & 101001000011010110100110000 & 01011001001010000001010010 \\ 00100011110001100000101010 & 10011010000110110100010011 & 000000001110100100100100 \\ 01000100110001010001001011 & 010100001001010101000110 & 11000011000100010110001 \end{bmatrix}$$

* * * * *